US011820904B2

(12) United States Patent
Teranishi et al.

(10) Patent No.: US 11,820,904 B2
(45) Date of Patent: Nov. 21, 2023

(54) BLACK INK COMPOSITION FOR INKJET PRINTING, AND METHOD FOR PRINTING ON HYDROPHOBIC FIBERS

(71) Applicant: Nippon Kayaku Kabushiki Kaisha, Tokyo (JP)

(72) Inventors: Makoto Teranishi, Tokyo (JP); Keijyou Sasaki, Tokyo (JP); Rima Akanuma, Tokyo (JP); Hiroko Higuchi, Tokyo (JP); Katsunori Fujii, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 411 days.

(21) Appl. No.: 17/256,805

(22) PCT Filed: Jul. 11, 2019

(86) PCT No.: PCT/JP2019/027546
§ 371 (c)(1),
(2) Date: Dec. 29, 2020

(87) PCT Pub. No.: WO2020/017430
PCT Pub. Date: Jan. 23, 2020

(65) Prior Publication Data
US 2021/0284853 A1 Sep. 16, 2021

(30) Foreign Application Priority Data
Jul. 18, 2018 (JP) .................. 2018-135028

(51) Int. Cl.
C09D 11/102 (2014.01)
B41M 5/00 (2006.01)
B41M 5/025 (2006.01)
B41M 7/00 (2006.01)
C09D 11/107 (2014.01)
C09D 11/328 (2014.01)
C09D 11/40 (2014.01)
D06P 1/00 (2006.01)
D06P 1/16 (2006.01)
D06P 1/92 (2006.01)
(Continued)

(52) U.S. Cl.
CPC ........... C09D 11/102 (2013.01); B41J 2/2107 (2013.01); B41M 5/0047 (2013.01); B41M 5/025 (2013.01); B41M 7/009 (2013.01); C09D 11/106 (2013.01); C09D 11/107 (2013.01); C09D 11/328 (2013.01); C09D 11/40 (2013.01); D06P 1/0096 (2013.01); D06P 1/16 (2013.01); D06P 1/908 (2013.01); D06P 1/928 (2013.01); D06P 5/30 (2013.01); D06P 2001/906 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

2001/0001103 A1* 5/2001 Noguchi ................. C09D 11/30
524/839
2014/0267514 A1* 9/2014 Mizutaki .................... B41J 2/01
347/100
(Continued)

FOREIGN PATENT DOCUMENTS

EP 2777940 A1 9/2014
EP 3023464 A2 5/2016
(Continued)

Primary Examiner — Manish S Shah
(74) Attorney, Agent, or Firm — Knobbe, Martens, Olson & Bear, LLP

(57) ABSTRACT

A black ink composition for inkjet printing that contains a water-soluble organic solvent, a resin emulsion, a dispersing agent, and at least four types of sublimation dyes. At least three of the sublimation dye types are C.I. disperse yellow, C.I. disperse red, and C.I. disperse blue, and at least one of the sublimation dye types has a maximum absorption wavelength in the wavelength band of 640 nm to less than 680 nm as measured from a visible spectral absorption of a solution obtained by dissolving the dye in acetone. An ink set for inkjet printing that includes the black ink composition for inkjet printing, and a method for printing on hydrophobic fibers that uses the composition and the ink set.

11 Claims, No Drawings

(51) Int. Cl.
  *D06P 5/30*    (2006.01)
  *D06P 1/90*    (2006.01)
  *C09D 11/106*  (2014.01)
  *B41J 2/21*    (2006.01)

(56) References Cited

U.S. PATENT DOCUMENTS

| | | | |
|---|---|---|---|
| 2015/0116418 A1* | 4/2015 | Oura | B41J 2/01 |
| | | | 524/207 |
| 2015/0130881 A1 | 5/2015 | Oguchi et al. | |
| 2016/0208119 A1 | 7/2016 | Oguchi et al. | |
| 2020/0109302 A1* | 4/2020 | Sasaki | B41J 2/2107 |
| 2021/0139727 A1* | 5/2021 | Akanuma | B41M 5/0047 |

FOREIGN PATENT DOCUMENTS

| | | |
|---|---|---|
| JP | H09-111173 A | 4/1997 |
| JP | H10-168151 A | 6/1998 |
| JP | 2004-018544 A | 1/2004 |
| JP | 2011-021133 A | 2/2011 |
| JP | 2014-177526 A | 9/2014 |
| JP | 2014-224215 A | 12/2014 |
| JP | 2014-224216 A | 12/2014 |
| JP | 2015-010212 A | 1/2015 |
| JP | 2015-093956 A | 5/2015 |
| JP | 2016-098269 A | 5/2016 |
| JP | 2016-132757 A | 7/2016 |
| JP | 2016-169289 A | 9/2016 |
| JP | 2017-078113 A | 4/2017 |
| JP | 2017-078115 A | 4/2017 |
| JP | 2017-171907 A | 9/2017 |
| JP | 6191234 B2 | 9/2017 |
| JP | 6250218 B1 | 12/2017 |
| JP | 2015-093957 A | 5/2018 |
| JP | 2018-070743 A | 5/2018 |
| JP | 2018-070744 A | 5/2018 |
| JP | 2018-150407 A | 9/2018 |
| WO | WO 2005/121263 A1 | 12/2005 |
| WO | WO 2014/129322 A1 | 8/2014 |
| WO | WO 2018/071858 A1 | 4/2018 |

* cited by examiner

BLACK INK COMPOSITION FOR INKJET PRINTING, AND METHOD FOR PRINTING ON HYDROPHOBIC FIBERS

This application is the U.S. National Phase under 35 U.S.C. § 371 of International Application PCT/JP2019/027546, filed Jul. 11, 2019, designating the U.S., and published in Japanese as WO 2020/017430 on Jan. 23, 2020, which claims priority to Japanese Patent Application No. 2018-135028, filed Jul. 18, 2018, the entire content of which is incorporated herein by reference.

TECHNICAL FIELD

The present invention relates to a black ink composition for inkjet textile printing, an ink set for inkjet textile printing, and a method for textile printing hydrophobic fibers using the same.

BACKGROUND ART

In recent years, there has been proposed a recording method for performing plate-less printing by inkjet, and textile printing by inkjet printing (inkjet textile printing) has also been performed in the printing of fibers including cloth, etc. Textile printing by inkjet printing has various advantages such as plate-free, resource saving, energy saving, and easy high-definition expression, compared to conventional textile printing methods such as screen printing, etc.

Here, hydrophobic fibers typified by polyester fibers are generally dyed by a water-insoluble coloring material. For this reason, as an aqueous ink for textile printing of hydrophobic fibers by inkjet printing, it is generally necessary to use dispersed inks, in which a water-insoluble coloring matter is dispersed in water, and which have good performance such as dispersion stability.

Inkjet textile printing methods for hydrophobic fibers are roughly divided into direct printing and sublimation transfer methods. The direct printing method is a textile printing method in which ink is directly applied (printed) to a hydrophobic fiber, and then a dye in the ink is heat treated by high temperature steaming or the like, so that the dye is dyed and fixed to the hydrophobic fiber. On the other hand, the sublimation transfer method is a textile printing method in which ink is applied (printed) to an intermediate recording medium (a special transfer paper, etc.), then an ink application surface of the intermediate recording medium and a hydrophobic fiber are superimposed on each other, and then a dye is transferred by heat from the intermediate recording medium to the hydrophobic fiber.

The sublimation transfer method is mainly used for printing of banner flags, etc. and easily sublimating dyes which are excellent in transferability to hydrophobic fibers by heat treatment are used in the ink. The processing steps include the two steps of (1) a printing step: a step of applying a dye ink to an intermediate recording medium by an inkjet printer; and (2) a transfer step: a step of transferring and dyeing the dye from the intermediate recording medium to the fiber by heat treatment. Since commercially available transfer papers can be widely used, pretreatment of fibers is not required, and a washing step is also omitted.

As an ink for use in the sublimation transfer method, an aqueous ink in which a water-insoluble sublimable dye is dispersed in water has been generally used. For example, Patent Document 1 discloses that an ink is prepared by adding a water-soluble organic solvent as a humectant (a drying inhibitor), a surfactant as a surface tension modifier, and other additives (a pH adjusting agent, an antiseptic and antifungal agent, a defoaming agent, etc.) to a dye dispersion obtained by dispersing a sublimable dye selected from a disperse dye and an oil-soluble dye in water using a dispersant, followed by optimizing physical properties such as particle size, viscosity, surface tension, and pH.

When a sublimable dye is used to express black, a plurality of dyes are usually combined to express black. This is because a single dye is not sufficient as black color hue, and the concentration is often also low. By combining a plurality of dyes, a good expression of black is achieved.

However, when fabric is dyed with a black ink in which a plurality of sublimable dyes are combined as described above, and irradiating the fabric with light from a light source having a different spectral distribution onto the fabric, black color hue expressed on the fabric appeared different in color in some cases, depending on the type of fabric. For example, even when a good black color could be represented under illumination with less long-wavelength light, such as fluorescent lamps, the black color sometimes looked reddish when viewed under sunlight with a large amount of long-wavelength light. Conversely, even when a good black color could be expressed under sunlight, the color sometimes looked bluish when viewed under fluorescent lamps. As described above, the characteristics that an illumination light source gives to the appearance of the color of an object are generally called "color rendering", and a black ink with little change in hue due to influence of color rendering is needed.

On the other hand, as an intermediate recording medium for the sublimation transfer method, special papers for inkjet, on the surface of which an ink receiving layer is formed by inorganic fine particles of silica, etc., and which have a relatively large basis weight, so that a large amount of ink can be applied are generally used. In recent years, a transfer paper having a smaller basis weight and a transfer paper having a smaller ink receiving layer have been used, and it is strongly required to achieve a high transfer efficiency and a dyeing concentration with a small amount of ink. In addition to this, there has been a demand for a black ink in which black color hue does not change depending on sublimation transfer conditions and sublimation rate is uniform.

Patent Document 2 discloses a black ink for inkjet used in a disperse dye ink for textile printing, in which the black ink for inkjet contains a water-soluble organic solvent including glycol ether and a first to fourth disperse dye each having a maximum absorption wavelength in a specific wavelength range in ultraviolet-visible spectroscopic absorption of a solution dissolved in acetone. Although this Patent Document 2 discloses an ink directly applied to a pretreated polyester fiber in a direct printing method, a technique relating to a sublimable dye which can be used in the sublimation transfer method has not been studied. Also, there is no disclosure on dyeing performance when a transfer paper having a small basis weight or a transfer paper having a small ink receiving layer is used.

Patent Document 1: PCT International Publication No. WO2005/121263
Patent Document 2: Japanese Patent No. 6191234

DISCLOSURE OF THE INVENTION

Problems to be Solved by the Invention

An object of the present invention is to provide a black ink composition for inkjet textile printing, which can produce, in sublimation transfer dyeing using an inkjet textile printing, a dyed product with little change in hue due to the influence of color rendering property, which has high sublimation transfer efficiency even when a transfer paper having a small basis weight or a transfer paper having a small ink receiving layer is used, by which a dyed product having a high concentration can be obtained, and by which a dyed product having black color of high quality and being excellent in light resistance; to provide an ink set for inkjet textile printing including the black ink composition for inkjet printing; and to provide a method for textile printing hydrophobic fibers using the same.

Means for Solving the Problems

As a result of extensive studies to solve the above problems, the present inventors have completed the following first to twelfth aspects of the present invention.

A first aspect of the present invention relates to a black ink composition for inkjet textile printing, containing a water-soluble organic solvent, a resin emulsion, a dispersant, and at least four sublimable dyes, in which at least three types of the sublimable dyes are dyes selected from the group consisting of C.I. Disperse Yellow, C.I. Disperse Red, and C.I. Disperse Blue, and at least one of the sublimable dyes is a sublimable dye having a maximum absorption wavelength in a wavelength range of 640 nm or more and less than 680 nm in visible spectroscopic absorption of a solution dissolved in acetone.

A second aspect of the present invention relates to the black ink composition for inkjet textile printing as described in the first aspect, in which the resin emulsion is a urethane resin emulsion.

A third aspect of the present invention relates to the black ink composition for inkjet textile printing as described in the first or second aspect, in which the dispersant is a styrene-(meth)acrylic copolymer or a formalin condensate of an aromatic sulfonic acid or a salt thereof.

A fourth aspect of the present invention relates to the black ink composition for inkjet textile printing as described in any one of the first to third aspects, in which the sublimable dye includes C.I. Disperse Yellow 54, C.I. Disperse Red 60, and C.I. Disperse Blue 360.

A fifth aspect of the present invention relates to the black ink composition for inkjet textile printing as described in any one of the first to fourth aspects, in which the sublimable dye having a maximum absorption wavelength in a wavelength range of 640 nm or more and less than 680 nm is a sublimable dye selected from the group consisting of C. I. Disperse Blue 359, C. I. Disperse Blue 60, and C. I. Disperse Blue 334.

A sixth aspect of the present invention relates to the black ink composition for inkjet textile printing as described in any one of the first to fifth aspects, in which the resin emulsion is a polycarbonate-based urethane resin emulsion.

A seventh aspect of the present invention relates to the black ink composition for inkjet textile printing as described in any one of the first to sixth aspects, in which the dispersant is a styrene-(meth)acrylic copolymer and the copolymer has a mass average molecular weight of 5,000 to 17,000 and an acid value of 100 to 250 mg KOH/g.

An eighth aspect of the present invention relates to the black ink composition for inkjet textile printing as described in any one of the first to sixth aspects, in which the dispersant is a dispersant selected from the group consisting of a formalin condensate of creosote oil sulfonic acid or a salt thereof and a formalin condensate of methylnaphthalene sulfonic acid or a salt thereof.

A ninth aspect of the present invention relates to the black ink composition for inkjet textile printing as described in any one of the first to eighth aspects, in which the water-soluble organic solvent includes at least one selected from glycerin and diglycerin.

A tenth aspect of the present invention relates to an ink set for inkjet textile printing including the black ink composition for inkjet textile printing as described in any one of the first to ninth aspects, a yellow ink composition for inkjet textile printing, a magenta ink composition for inkjet textile printing, and a cyan ink composition for inkjet textile printing.

An eleventh aspect of the present invention relates to a method for textile printing of a hydrophobic fiber, including: a printing step of using, as an ink, the black ink composition for inkjet textile printing as described in any one of the first to ninth aspects or each ink composition included in the ink set for inkjet textile printing as described in the tenth aspect and attaching a droplet of the ink to an intermediate recording medium by an inkjet printer to obtain a recorded image; and a transfer step of transferring the recorded image to the hydrophobic fiber by contacting the hydrophobic fiber with a surface to which the ink is attached in the intermediate recording medium, followed by heat treatment.

A twelfth aspect of the present invention relates to a dyed hydrophobic fiber obtained by the method for textile printing of a hydrophobic fiber, as described in the eleventh aspect.

Effects of the Invention

According to the present invention, it is possible to produce a dyed product having little change in hue due to the influence of color rendering property, in sublimation transfer dyeing using inkjet textile printing. Additionally, the black ink composition for inkjet textile printing achieves high sublimation transfer efficiency even when a transfer paper having a small basis weight or a transfer paper having a small ink receiving layer is used, and a high-quality black dyed product excellent in light resistance can be obtained. The present invention can further provide an ink set for inkjet textile printing including the black ink composition for inkjet textile printing and a method for textile printing a hydrophobic fiber using the same.

PREFERRED MODE FOR CARRYING OUT THE INVENTION

<Black Ink Composition for Inkjet Textile Printing>

The black ink composition for inkjet textile printing as described in the present embodiment (hereafter simply referred to as the "black ink composition") contains a water-soluble organic solvent, a resin emulsion, a dispersant, and at least four sublimable dyes. Among the at least four sublimable dyes, at least three types are dyes selected from the group consisting of C.I. Disperse Yellow, C.I. Disperse Red, and C.I. Disperse Blue and at least one is a sublimable dye having a maximum absorption wavelength in a wavelength range of 640 nm or more and less than 680 nm in visible spectroscopic absorption of a solution dissolved in acetone. Hereinafter, each component contained in the black ink composition as described in the present embodiment will be described.

[Water-Soluble Organic Solvents]

Examples of the water-soluble organic solvent include glycol-based solvents, polyhydric alcohols, pyrrolidones, etc. Examples of the glycol-based solvent include glycerin, polyglycerin (#310, #750, #800), diglycerin, triglycerin, tetraglycerin, pentaglycerin, hexaglycerin, heptaglycerin, octaglycerin, nonaglycerin, decaglycerin, undecaglycerin, dodecaglycerin, tridecaglycerin, tetradecaglycerin, etc. Examples of the polyhydric alcohol include C2 to C6 polyhydric alcohols having 2 to 3 alcoholic hydroxy groups, di- or tri-C2 to C3 alkylene glycols, poly C2 to C3 alkylene glycols having 4 or more repeating units and having a molecular weight of about 20,000 or less (preferably a liquid polyalkylene glycol), etc. Examples of the polyhydric alcohol include ethylene glycol, diethylene glycol, triethylene glycol, propylene glycol, polyethylene glycol, polypropylene glycol, 1,3-propanediol, 1,2-butanediol, thiodiglycol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, 1,6-hexanediol, trimethylolpropane, 1,3-pentanediol, 1,5-pentanediol, etc. Examples of the pyrrolidone include 2-pyrrolidone, N-methyl-2-pyrrolidone, etc. Further, a compound or the like which is dissolved in water and serves as a wetting agent is also included in the water-soluble organic solvent for convenience. Examples of such a compound include urea, ethylene urea, saccharides, etc. One type of the water-soluble organic solvent may be used alone or two or more types thereof may be used in combination.

As the water-soluble organic solvent, at least one type selected from glycerin and diglycerin are preferably contained. Considering the storage stability of the black ink composition, a solvent having a small solubility with regard to the sublimable dye is preferred, and in particular, it is preferable to use glycerin and a solvent other than glycerin (preferably a polyhydric alcohol other than glycerin) in combination.

[Resin Emulsion]

Examples of the resin emulsion include emulsions formed of an acrylic resin, an epoxy resin, a urethane resin, a polyether resin, a polyamide resin, an unsaturated polyester resin, a phenol resin, a silicone resin, a fluorine resin, a polyvinyl resin (vinyl chloride, vinyl acetate, polyvinyl alcohol, etc.), an alkyd resin, a polyester resin, an amino resin (a melanin resin, a urea resin, a melanin formaldehyde resin, etc.), and the like. The resin emulsion may contain two or more types of resins. In addition, the two or more types of resins may form a core/shell structure. One type of the resin emulsion may be used alone, or two or more types thereof may be used in combination. Among the resin emulsions, a urethane resin emulsion is preferred from the viewpoint of ink performance.

Urethane resin emulsions are available as a commercial product, and many of them are in the form of emulsion with a solid content of 30 to 60% by mass. Examples of commercially available products of the urethane resin emulsion include PERMARIN UA-150, 200, 310, 368 and 3945 and UCOAT UX-320 (all of which are manufactured by Sanyo Chemical Industries, Ltd.); HYDRAN WLS-201 and 210 and latex of HW-312B (manufactured by DIC Corporation); Superflex 150, 170 and 470 (all of which are manufactured by DKS Co., Ltd.); etc. Among these, examples of the polycarbonate-based urethane resin include PERMARIN UA-310 and 3945; UCOAT UX-320; and the like. Further, examples of the polyether-based urethane resin include PERMARIN UA-150 and 200; UCOAT UX-340; and the like.

The urethane resin in the urethane resin emulsion preferably has an SP value of 8 to 24 $(cal/cm^3)^{1/2}$, more preferably 8 to 17 $(cal/cm^3)^{1/2}$, and most preferably 8 to 11 $(cal/cm^3)^{1/2}$. Note that the SP value of the urethane resin is calculated by a Fedors method. When the urethane resin has an acidic group and this acidic group is neutralized to prepare an emulsion, the SP value of the urethane resin before neutralization is used.

When the urethane resin in the urethane resin emulsion has an acidic group such as a carboxy group, a sulfo group, or a hydroxy group, the acidic group may be in the form of an alkali salt. For example, an acidic group can be changed to an alkali salt by charging a urethane resin having an acidic group into water and stirring to prepare an aqueous solution, and then charging an alkaline compound into the aqueous solution to adjust the pH to 6.0 to 12.0. Examples of the alkaline compound include hydroxides of alkali metals such as lithium hydroxide, sodium hydroxide, potassium hydroxide, etc.; hydroxides of alkaline earth metals such as beryllium hydroxide, magnesium hydroxide, calcium hydroxide, strontium hydroxide, etc. One type of the alkaline compound may be used alone or two or more types thereof may be used in combination.

[Sublimable Dyes]

Examples of the sublimable dye include dyes having preferably grade 3 to 4 or lower, more preferably grade 3 or lower, as a test result of dry heat treatment test (method C) staining (polyester) in "Test methods for color fastness to dry heat [JIS L 0879:2005] (revised on Jan. 20, 2005, published by the Japanese Standards Association Group)" and "ISO 105-P01, Textiles-Tests for colour fastness-Part P01:Colour fastness to dry heat (excluding pressing)". Among such known sublimable dyes, examples of dyes having C.I. numbers include the following dyes. Examples of yellow dyes include C.I. Disperse Yellow 3, 7, 8, 23, 39, 51, 54, 60, 71, 82 and 86; C.I. Solvent Yellow 114 and 163, etc. Examples of orange dyes include C.I. Disperse Orange 1, 1:1, 5, 7, 20, 23, 25, 25:1, 33, 56 and 76; C.I. Solvent Orange 60 and 67, etc. Examples of brown dyes include C.I. Disperse Brown 2 and 27, etc. Examples of red dyes include C.I. Disperse Red 4, 11, 50, 53, 55, 55:1, 59, 60, 65, 70, 75, 93, 146, 158, 190, 190:1, 207, 239, 240 and 364; C.I. Solvent Red 146; C.I. Vat Red 41, etc. Examples of violet dyes include C.I. Disperse Violet 8, 11, 17, 23, 26, 27, 28, 29, 36 and 57, etc. Examples of blue dyes include C.I. Disperse Blue 3, 5, 19, 26, 26:1, 35, 55, 56, 58, 60, 64, 64:1, 72, 72:1, 81, 81:1, 91, 95, 108, 131, 141, 145, 334, 359, 360 and 336; C.I. Solvent Blue 3, 36, 63, 83, 105 and 111, etc. Among these, C.I. Disperse Yellow 54, C.I. Disperse Orange 25, C.I. Disperse Red 60, C.I. Disperse Blue 60, 72, 334, 359 and 360 are preferable.

These sublimable dyes can be classified into the following respective compounds, such as anthraquinone-based compounds, azo-based compounds, azomethine-based compounds, indophenol-based compounds, indoaniline-based compounds, quinophthalone-based compounds, methine-based compounds, anthrapyridone-based compounds, naphthalimide-based compounds, xanthene-based compounds, triallylmethane-based compounds, quinacridone-based compounds, oxazine-based compounds, pyrroline-based compounds, cyanine-based compounds, phthalocyanine-based compounds, etc. Among them, it is preferable that the dyes contain at least two types of dyes, including a combination of an anthraquinone-based compound and an anthraquinone-based compound, a combination of an anthraquinone-based compound and an azo-based compound, a combination of an anthraquinone-based compound and an azomethine-based compound, a combination of an anthraquinone-based compound and an indophenol-based compound, a combination of an anthraquinone-based compound and an indoaniline-based compound, a combination of an anthraquinone-based compound and a pyrroline-based compound, a combination of a quinophthalone-based compound and a quinophthalone-based compound, a combination of a quinophthalone-based compound and an anthraquinone-based compound, a combination of a quinophthalone-based compound and an azo-based compound, a combination of a quinophthalone-based compound and a naphthalimide-based compound, a combination of an azo-based compound and an azo-based compound, a combination of an azo-based compound and an azomethine-based compound, a combination of an azo-based compound and an indophenol-based compound, a combination of an azo-based compound and an indoaniline-based compound, a combination of an azo-based compound and a pyrroline-based compound, etc. Among these combinations, it is preferable to contain at least two types of dyes, including a combination of an anthraquinone-based compound and an anthraquinone-based compound, a combination of an anthraquinone-based compound and an azo-based compound, a combination of a quinophthalone-based compound and an azo-based compound, and a combination of a quinophthalone-based compound and an anthraquinone-based compound.

The sublimable dye may be a powdery or lumpy dry coloring material and may be a wet cake or a slurry. In addition, the sublimable dye may contain a small amount of a dispersant such as a surfactant for the purpose of suppressing aggregation of the coloring matter particles during or after synthesis of the coloringmatter. Commercially available coloring matters are classified to several grades, such as for industrial dyeing, for resin coloring, for ink, for toner, for inkjet, and the like, and the respective grades differ in manufacturing method, purity, particle size, and the like. In order to suppress cohesiveness after pulverization, those having smaller particles are preferred as the coloringmatter, and those having as few impurities as possible are preferred due to the influence on the dispersion stability and the ejection accuracy of the ink. When black is expressed, a blue dye as a main dye is blended with an orange dye and a red dye, and the blended dye can be used as a coloring matter for black. Further, the black ink composition according to the present embodiment may contain a small amount of another water-insoluble coloring matter for the purpose of adjusting the color tone.

In particular, the black ink composition according to the present embodiment contains at least four types of sublimable dyes, and at least three of them are dyes selected from the group consisting of C.I. Disperse Yellow, C.I. Disperse Red, and C.I. Disperse Blue, and at least one of them is a sublimable dye having a maximum absorption wavelength in a wavelength range of 640 nm or more and less than 680 nm in visible spectroscopic absorption of a solution dissolved in acetone.

As the dye selected from the group consisting of C.I. Disperse Yellow, C.I. Disperse Red, and C.I. Disperse Blue, the above-mentioned dyes may be used. Among of them, C.I. Disperse Yellow 54, C.I. Disperse Red 60, and C.I. Disperse Blue 360 are preferred.

Examples of the sublimable dye having a maximum absorption wavelength in a wavelength range of 640 nm or more and less than 680 nm in the visible spectroscopic absorption spectra of a solution dissolved in acetone include C.I. Disperse Blue 60, 334, 359, and the like.

As the ink composition according to the present embodiment, an ink composition containing sublimable dyes including C.I. Disperse Yellow 54, C.I. Disperse Red 60, C.I. Disperse Blue 359, and C.I. Disperse Blue 360 is particularly preferred and an ink composition containing sublimable dyes consisting of C.I. Disperse Yellow 54, C.I. Disperse Red 60, C.I. Disperse Blue 359, and C.I. Disperse Blue 360 is very much preferred. The content ratio of Disperse Yellow 54, C.I. Disperse Red 60, C.I. Disperse Blue 359, and C.I. Disperse Blue 360 is preferably 0.4 to 5.0:0.7 to 8.0:0.1 to 3.0:0.5 to 5.0, and more preferably 0.4 to 4.0:0.7 to 7.0:0.1 to 2.0:0.5 to 4.0 on a mass basis.

[Dispersants]

Examples of the dispersant include styrene-(meth)acrylic copolymers and formalin condensates of aromatic sulfonic acids or salts thereof. One type of the dispersant may be used alone, or two or more types thereof may be used in combination.

The styrene-(meth)acrylic copolymer is a copolymer of a styrene-based monomer and a (meth)acrylic monomer. Examples of these copolymers include ($\alpha$-methyl)styrene-acrylic acid copolymers, ($\alpha$-methyl)styrene-acrylic acid-acrylate ester copolymers, ($\alpha$-methyl)styrene-methacrylic acid copolymers, ($\alpha$-methyl)styrene-methacrylic acid-acrylate ester copolymers, ($\alpha$-methyl)styrene-maleic anhydride/acid copolymers, acrylate ester-maleic anhydride/acid copolymers, ($\alpha$-methyl)styrene-acrylate ester-maleic anhydride/acid copolymers, acrylate ester-allylsulfonate ester copolymers, acrylate ester-styrenesulfonic acid copolymers, ($\alpha$-methyl)styrene-methacrylsulfonic acid copolymers, polyester-acrylic acid copolymers, polyester-acrylic acid-acrylate ester copolymers, polyester-methacrylic acid copolymers, polyester-methacrylic acid-acrylic acid copolymers, and the like. Among these, a copolymer in which the compound including an aromatic hydrocarbon group is styrene is preferred. Note that "(meth)acryl" is used in this specification as meaning that "acryl" and "methacryl" are included. In addition, "($\alpha$-methyl)styrene" is used as meaning that "$\alpha$-methylstyrene" and "styrene" are included.

The mass average molecular weight of the styrene-(meth)acrylic copolymer is, for example, preferably 1,000 to 20,000, more preferably 2,000 to 19,000, and most preferably 5,000 to 17,000. The mass average molecular weight of the styrene-(meth)acrylic copolymer is measured by a GPC (gel permeation chromatography) method.

Further, the acid value of the styrene-(meth)acrylic copolymer is, for example, preferably 50 to 250 mg KOH/g, more preferably 100 to 250 mg KOH/g, and most preferably 150 to 250 mg KOH/g. By setting the acid value to 50 mg KOH/g or more, solubility in water tends to be good, and the dispersion stabilizing ability of the sublimable dye tends to be improved. Further, by setting the acid value to 250 mg KOH/g or less, affinity with an aqueous medium is suppressed, and occurrence of blurring in an image after printing tends to be suppressed. The acid value of the resin represents the number of mg of KOH required to neutralize 1 g of the resin, and is measured according to JIS-K3054.

Further, the glass transition temperature of the styrene-(meth)acrylic copolymer is preferably, for example, 45 to 135° C., more preferably 55 to 120° C., and most preferably 60 to 110° C.

Commercially available products of the styrene-(meth)acrylic copolymers include Joncryl® 67, 678, 680, 682, 683, 690, 52J, 57J, 60J, 63J, and 70J, JDX-6180, HPD-196, HPD96J, PDX-6137A, 6610, JDX-6500, JDX-6639, PDX-6102B, PDX-6124 (manufactured by BASF), and the like. Among these, Joncryl 67 (mass average molecular weight: 12,500, acid value: 213 mg KOH/g), 678 (mass average molecular weight: 8,500, acid value: 215 mg KOH/g), 682 (mass average molecular weight: 1,700, acid value: 230 mg KOH/g), 683 (mass average molecular weight: 4,900, acid value: 215 mg KOH/g), and 690 (mass average molecular weight: 16,500, acid value: 240 mg KOH/g) are preferred, and Joncryl 678 is the most preferred. Note that, in this specification, the superscripted RTM means a registered trademark.

Dispersion of a sublimable dye can be carried out, for example, by the following method. That is, a styrene-(meth) acrylic copolymer is fed into a water-soluble organic solvent, and a temperature is increased to 90 to 120° C. to prepare a solution containing a styrene-(meth)acrylic copolymer dissolved. An alkaline compound and water are fed into the styrene-(meth)acrylic copolymer solution prepared, the temperature is lowered to obtain an emulsion liquid, and a sublimable dye is mixed into the obtained emulsion liquid obtained, followed by dispersion treatment.

Examples of the formalin condensate of aromatic sulfonic acid or a salt thereof include formalin condensates of creosote oil sulfonic acid, cresol sulfonic acid, phenolsulfonic acid, β-naphthalenesulfonic acid, β-naphtholsulfonic acid, β-naphthalene sulfonic acid, β-naphtholsulfonic acid, benzenesulfonic acid, cresol sulfonic acid, 2-naphthol-6-sulfonic acid, lignin sulfonic acid, etc., or a salt thereof (sodium salt, potassium salt, lithium salt, and the like). Among these, each of the formalin condensates of creosote oil sulfonic acid, β-naphthalenesulfonic acid, and lignin sulfonic acid or a salt thereof is preferred.

Formalin condensates of aromatic sulfonic acids can also be obtained as commercial products. For example, as the formalin condensate of β-naphthalenesulfonic acid, Demol N (manufactured by Kao Corporation) can be mentioned. Examples of the formalin condensates of creosote oil sulfonic acid include Lavelin W series and Demol C (all of which are manufactured by Kao Corporation). Examples of the formalin condensate of a special aromatic sulfonic acid include Demol SN-B (manufactured by Kao Corporation). Examples of the formalin condensate of methylnaphthalenesulfonic acid include Lavelin AN series (manufactured by DKS Co., Ltd.). Among these, Demol N, Lavelin AN series, and Lavelin W series are preferred; Demol N and Lavelin W are more preferred; and Lavelin W is the most preferred.

[Other Components]

In addition to the above components, the black ink composition according to the present embodiment may contain an ink preparation agent such as an antiseptic and antifungal agent, a water-soluble ultraviolet absorbing agent, a pH adjusting agent, a surface tension adjusting agent, water, etc.

Examples of the antiseptic and antifungal agent include organic nitrogen and sulfur-based compounds, organic halogen-based compounds, haloallylsulfone-based compounds, iodopropagyl-based compounds, N-haloalkylthio-based compounds, nitrile-based compounds, pyridine-based compounds, 8-oxyquinoline-based compounds, benzothiazole-based compounds, isothiazoline-based compounds, dithiol-based compounds, pyridine oxide-based compounds, nitropropane oxide-based compounds, organotin-based compounds, phenol-based compounds, quaternary ammonium salt-based compounds, triazine-based compounds, thiazine-based compounds, anilide-based compounds, adamantane-based compounds, dithiocarbamate-based compounds, brominated indanone-based compounds, benzyl bromoacetate-based compounds, inorganic salt-based compounds, and the like. Examples of the organic halogen-based compound include sodium pentachlorophenol and the like. Examples of the pyridine oxide-based compounds include 2-pyridinethiol-1-oxide sodium salt and the like. Examples of the isothiazoline-based compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like. Examples of the other antiseptic and antifungal agent include sodium acetate, sodium sorbate, sodium benzoate, and Proxel® GXL (S) and Proxel® XL-2 (S), which are trade names of products manufactured by Arch Chemicals Inc.

Examples of the water-soluble ultraviolet absorbing agent include sulfonated benzophenone-based compounds, benzotriazol-based compounds, salicylic acid-based compounds, cinnamic acid-based compounds, triazine-based compounds, etc.

Examples of the pH adjusting agent include alkali hydroxides such as sodium hydroxide, potassium hydroxide, lithium hydroxide, etc.; tertiary amines such as triethanolamine, diethanolamine, dimethylethanolamine, diethylethanolamine, etc.; and the like.

Examples of the surface tension adjusting agent include surfactants. Examples of the type of the surfactant include anionic surfactants, cationic surfactants, amphoteric surfactants, nonionic surfactants, silicone-based, fluorine-based surfactants, etc.

Examples of the anionic surfactant include alkylsulfocarboxylic acid salts; α-olefinsulfonic acid salts; polyoxyethylenealkyl ether acetic acid salts; N-acylamino acids or salts thereof; N-acylmethyltaurine salts; alkylsulfate polyoxyalkyl ether sulfuric acid salts; alkylsulfate polyoxyethylenealkyl ether phosphoric acid salts; rosin acid soap; castor oil sulfate ester salts; lauryl alcohol sulfate ester salts; alkylphenolic phosphate esters; alkylated phosphate esters; alkylarylsulfonic acid salts; and sulfosuccinic acid type surfactants, such as diethyl sulfosuccinic acid salts, diethylhexyl sulfosuccinic acid salts, and dioctyl sulfosuccinic acid salts. Examples of commercially available products include Lipal (trade name) 835I, 860K, 870P, NTD, and MSC manufactured by Lion Corporation; Adeka Col (trade name) EC8600 manufactured by Adeka Corporation; Pelex (trade name) OT-P, CS, TA, and TR manufactured by Kao Corporation; Rikamild ES-100 and ES-200 and Rikasurf P-10, M-30, M-75, M-300, G-30, and G-600 manufactured by New Japan Chemical Co., Ltd.; Kohakunol L-300, L-40, L-400, and NL-400 manufactured by Toho Chemical Industry Co., Ltd., etc.

Examples of the cationic surfactant include 2-vinylpyridine derivatives and poly(4-vinylpyridine) derivatives.

Examples of the amphoteric surfactant include lauryl dimethylaminoacetic acid betaine, 2-alkyl-N-carboxymethyl-N-hydroxyethylimidazolinium betaine, coconut oil fatty acid amide propyl dimethylaminoacetic acid betaine, polyoctyl polyaminoethylglycine, imidazoline derivatives, and the like.

Examples of the nonionic surfactant include ethers, such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, etc.; esters, such as polyoxyethylene oleate, polyoxyethylene distearate, sorbitan laurate, sorbitan monostearate, sorbitan monooleate, sorbitan sesquioleate, polyoxyethylene monooleate, polyoxyethylene stearate, etc.; acetylene glycols (alcohols), such as 2,4,7,9-tetramethyl-5-decyne-4,7-diol, 3,6-dimethyl-4-octyne-3,6-diol, 3,5-dimethyl-1-hexyn-3-ol, etc.; Surfynol (trade name) 104, 105, 82, 465, etc. manufactured by Air Products Japan Co., Ltd; and the like.

Examples of the silicone-based surfactant include polyether-modified siloxanes and polyether-modified polydimethylsiloxanes. Examples of commercially available products include BYK-347 (polyether-modified siloxane); BYK-345 and BYK-348 (polyether-modified polydimethylsiloxane); and the like, all of which are manufactured by BYK.

Examples of the fluorine-based surfactant include perfluoroalkylsulfonic acid compounds, perfluoroalkylcarboxylic acid-based compounds, perfluoroalkylphosphate ester compounds, perfluoroalkylethylene oxide adducts, a polyoxyalkylene ether polymer compounds having a perfluoroalkylether group in its side chain, etc. Examples of commercially available products include Zonyl TBS, FSP, FSA, FSN-100, FSN, FSO-100, FSO, FS-300, Capstone FS-30 and FS-31 (all of which are manufactured by DuPont Co., Ltd.); PF-151N and PF-154N (both of which are manufactured by Omnova Solutions Inc.); and the like.

The water used for preparing the black ink composition is preferably one having fewer impurities such as ion-exchanged water and distilled water.

[Method for Preparing Black Ink Composition, Etc.]

The method for preparing the black ink composition according to the present embodiment is not particularly limited, and examples thereof include a method comprising preparing an aqueous dispersion of a sublimable dye and then adding a water-soluble organic solvent, an ink preparation agent, and the like.

Examples of a method of preparing an aqueous dispersion of a sublimable dye include a known method such as stirring and mixing each component constituting the aqueous dispersion using a sand mill (bead mill), a roll mill, a ball mill, a paint shaker, an ultrasonic disperser, a microfluidizer, or the like. Since foaming may occur when preparing an aqueous dispersion of a sublimable dye, a defoaming agent such as a silicone-based defoaming agent or an acetylene alcohol-based defoaming agent may be added if necessary. However, since some of the defoaming agents inhibit dispersion or microparticulation of the sublimable dye, it is preferable to use those which do not affect microparticulation, stability of the aqueous dispersion, and the like. Preferred defoaming agents include, for example, an Olfin series (SK-14 or the like) manufactured by Nissin Chemical Industry Co., Ltd.; Surfynol series (104, DF-110D, or the like) manufactured by Air Products Japan Co., Ltd.; and the like.

The content of the sublimable dye in the aqueous dispersion is typically 10 to 60% by mass, preferably 15 to 50% by mass, and more preferably 15 to 30% by mass, based on the total mass of the aqueous dispersion. In addition, the content ratio of the dispersant in the aqueous dispersion is typically 1 to 36% by mass, preferably 4 to 30% by mass, and more preferably 4 to 20% by mass, based on the total mass of the aqueous dispersion.

The content ratio of the aqueous dispersion in the black ink composition according to the present embodiment is typically 5 to 85% by mass, preferably 10 to 85% by mass, and more preferably 14 to 80% by mass, based on the total mass of the black ink composition. Further, the content ratio of the water-soluble organic solvent is typically 10 to 50% by mass, preferably 10 to 40% by mass, and more preferably 10 to 35% by mass. Furthermore, the total content of the ink preparation agent is typically 0 to 25% by mass, and preferably 0.01 to 20% by mass.

The black ink composition prepared is preferably subjected to microfiltration for the purpose of preventing clogging of the nozzles of the inkjet printer. The pore size of the filter used for microfiltration is typically 0.1 to 1.0 μm, and preferably 0.1 to 0.8 μm.

It is preferable for the black ink composition according to the present embodiment to be adjusted to have appropriate physical property values in consideration of discharge amount, response speed, ink droplet flight characteristics, and the like of the inkjet printer to be used. The viscosity of the black ink composition according to the present embodiment at 25° C. is preferably about 3 to 20 mPa·s when measured by an E-type viscometer, from the viewpoint of discharge response characteristics at high speed. Further, the surface tension of the black ink composition according to the present embodiment at 25° C. is preferably about 20 to 45 mN/m as measured by the plate method.

Although the black ink composition according to the present embodiment can be used in various fields, it is suitable for an aqueous ink for writing, an aqueous printing ink, an information recording ink, a textile printing, and the like. In particular, the black ink composition according to the present embodiment has a high color rendering property, and even when a transfer paper having a small basis weight or a transfer paper having a small ink receiving layer is used, a high sublimation transfer efficiency is achieved, and a dyed product having a high dyeing concentration and excellent light resistance can be obtained. Further, printability required as an ink for various textile printing inks, particularly as an ink for inkjet textile printing, can be maintained. Thus, the black ink composition according to the present embodiment is extremely useful as a black ink composition for inkjet textile printing for sublimation transfer, among other things. Note that when the numerical value of the dyeing concentration is 1.50 or more in the dyeing concentration evaluation, which is described below, and when the numerical value of color difference is less than 2.1 in the color rendering property evaluations 1 and 2, which are described below, these values mean that the black color has a high dyeing concentration and excellent color rendering property with little color variation under various light sources. Thus, a better printed product in black color is obtained, so that such a black ink composition is more excellent as a black ink composition for inkjet textile printing.

In addition, the black ink composition according to the present embodiment is excellent in storage stability without solid precipitation, change in physical properties, change in color, and the like after storage for a long period of time. In addition, an initial filling property to an inkjet printer head is favorable, and stability in continuous printing is also favorable. Moreover, a clear image can be obtained without blurring of the image on a paper after printing; there is no odor on the paper after printing; and there is little influence on odor on a printed matter and a printing work environment. In addition to these, the dyed product dyed with the black ink composition according to the present embodiment has high dyeing concentration, excellent light resistance, and black color hue of high quality.

Further, by constituting an ink set for inkjet textile printing in combination with ink compositions of at least three colors, that is, a yellow ink composition for inkjet textile printing, a magenta ink composition for inkjet textile printing, and a cyan ink composition for inkjet textile printing, inkjet textile printing of full color which is excellent in various fastness and excellent in uniform dyeing property becomes possible.

<Method for Textile Printing Hydrophobic Fibers>

The method for textile printing hydrophobic fibers according to the present embodiment is a method in which the black ink composition according to the present embodiment is used as an ink and hydrophobic fibers are printed using the ink. The hydrophobic fibers include, for example, polyester fibers, nylon fibers, triacetate fibers, diacetate fibers, polyamide fibers, and mixed spun fibers using two or more species of these fibers, and the like. In addition, fibers obtained by mix-spinning these hydrophobic fibers with regenerated fibers such as rayon, or natural fibers such as cotton, silk, wool, etc. are also included in the hydrophobic fibers in the present specification. Some of these fibers are known to have an ink-receiving layer (blurring prevention layer), and such fibers are also included in the hydrophobic fibers. Methods for forming an ink-receiving layer are known in the art, and fibers having an ink-receiving layer are also commercially available. The material, structure, and the like of the ink-receiving layer are not particularly limited, and may be used as appropriate depending upon the purpose and the like.

The textile printing methods of hydrophobic fibers are roughly classified into a direct printing method and sublimation transfer printing method.

The direct printing method includes: a printing step, in which the ink composition according to the present embodiment is used as an ink and a droplet of the ink is attached to a hydrophobic fiber by an inkjet printer; a fixing step, in which a dye in the ink attached to the hydrophobic fiber in the printing step is fixed to the hydrophobic fiber by way of heat; and a washing step, in which an unfixed dye remaining in the hydrophobic fiber is washed off.

The fixing step is generally performed by known steaming or baking. The steaming includes, for example, a method for dyeing and fixing (also referred to as wet heat fixing) a dye to the hydrophobic fiber by treating a hydrophobic fiber with a high-temperature steamer, typically at 170 to 180° C. for about 10 minutes, or with a high-pressure steamer, typically at 120 to 130° C. for about 20 minutes. The baking (thermosol) includes, for example, a method for dyeing and fixing (also referred to as dry heat fixing) a dye to a hydrophobic fiber by treating the fiber normally at 190 to 210° C. for about 6 to 120 seconds.

The washing step is a step of washing off the obtained fiber with warm water and, if necessary, with ambient temperature water. The warm water or ambient temperature water to be used for washing may contain a surfactant. The washed fiber is also preferably dried, usually at 50 to 120° C. for 5 to 30 minutes.

On the other hand, the sublimation transfer method includes: a printing step, in which the ink composition according to the present embodiment is used as ink and a droplet of the ink is attached to an intermediate recording medium by an inkjet printer to obtain a recorded image; and a transfer step, in which the recorded image is transferred to a hydrophobic fiber by contacting the hydrophobic fiber with a surface to which the ink is attached in the intermediate recording medium, followed by heat treatment.

As the intermediate recording medium, an intermediate recording medium in which the dye in the attached ink does not agglomerate on the surface thereof and sublimation of the dye is not hindered when the recorded image is transferred to the hydrophobic fibers is preferred. As an example of such an intermediate recording medium, a paper on the surface of which an ink-receiving layer is formed with inorganic fine particles such as silica may be mentioned, and a special paper for inkjet, or the like may be used.

The heat treatment in the transfer step typically includes dry heat treatment at about 190 to 200° C.

The method for printing a hydrophobic fiber according to the present embodiment may further include a step of pretreating the fiber for the purpose of preventing blurring or the like. This pretreating step includes a step of applying an aqueous solution (a pretreating liquid) containing a sizing material, an alkaline substance, a reduction inhibitor, and a hydrotropic agent to the fiber before the ink is attached.

Examples of the sizing agent include natural gums such as guar, locust bean, etc.; starches; marine algae such as sodium alginate, Gloiopeltis, etc.; plant skin such as pectic acid, etc.; fibrous derivatives such as methyl fibrin, ethyl fibrin, hydroxyethyl cellulose, carboxymethyl cellulose, etc.; processed starch such as carboxymethyl starch, etc.; synthetic glue such as polyvinyl alcohol and polyacrylate esters; and the like. Sodium alginate is preferable.

The alkaline substance includes, for example, alkali metal salts of inorganic acids or organic acids; salts of alkaline earth metals; compounds which liberate alkali when heated; and the like. Alkali metal hydroxides and alkali metal salts are preferable. Examples include alkali metal hydroxides such as sodium hydroxide, calcium hydroxide, etc.; alkali metal salts of inorganic compounds such as sodium carbonate, sodium bicarbonate, potassium carbonate, sodium dihydrogen phosphate, disodium hydrogen phosphate, sodium phosphate, etc. alkali metal salts of organic compounds such as sodium formate, sodium trichloroacetate, etc.; and the like. Sodium bicarbonate is preferable.

As the reduction inhibitor, sodium meta-nitrobenzenesulfonate is preferable. As the hydrotropic agent, ureas such as urea, dimethylurea, etc. may be exemplified, and urea is preferable.

With regard to the sizing agent, the alkaline substance, the reduction inhibitor, and the hydrotropic agent, any one type may be used alone, or two or more types may be used in combination.

The mixing ratio of each component in the pretreating liquid is, for example, 0.5 to 5% by mass of the sizing agent, 0.5 to 5% by mass of sodium bicarbonate, 0 to 5% by mass of sodium meta-nitrobenzenesulfonate, 1 to 20% by mass of urea, and the balance of water.

Methods of attaching the pretreating liquid to hydrophobic fibers include, for example, a padding method. The aperture ratio of padding is preferably about 40 to 90%, and more preferably about 60 to 80%.

EXAMPLES

In the following, the present invention is explained in more detail by way of the Examples; however, the present invention is not limited to these Examples. In the Examples, unless otherwise specified, "parts" indicates parts by mass and "%" indicates % by mass.

Preparation Example 1: Preparation of Emulsion Liquid

To a mixture of 48% lithium hydroxide (3.2 parts), ion-exchanged water (56.8 parts) and propylene glycol (20 parts), 20 parts of Joncryl 678 (manufactured by BASF Corporation) were added, and the mixture was heated to 90 to 120° C. and stirred for 5 hours to obtain an emulsion liquid of Joncryl 678.

Preparation Example 2: Preparation of Aqueous Dispersion 1

A mixture of Kayaset Yellow AG (30 parts) (C.I. Disperse Yellow 54, manufactured by Nippon Kayaku Co., Ltd.) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 1.

Preparation Example 3: Preparation of Aqueous Dispersion 2

A mixture of Kayaset Red B (30 parts) (C.I. Disperse Red 60, manufactured by Nippon Kayaku Co., Ltd.) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 2.

Preparation Example 4: Preparation of Aqueous Dispersion 3

A mixture of C.I. Disperse Blue 359 (30 parts) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 3.

Preparation Example 5: Preparation of Aqueous Dispersion 4

A mixture of C.I. Disperse Blue 360 (30 parts) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 4.

Preparation Example 6: Preparation of Aqueous Dispersion 5

A mixture of C.I. Disperse Brown 27 (30 parts) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill using 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 5.

Preparation Example 7: Preparation of Aqueous Dispersion 6

A mixture of C.I. Disperse Orange 25 (30 parts) as the sublimable dye, the emulsion liquid (60 parts) of Joncryl 678 obtained in Preparation Example 1, Proxel GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid obtained, ion-exchanged water (60 parts) and the emulsion liquid (30 parts) of Joncryl 678 obtained in Preparation Example 1 were added to adjust the dye content to 15%, followed by filtration using a glass fiber filter paper GC-50 (manufactured by Advantec Co., Ltd., pore size of the filter: 0.5 μm), to obtain aqueous dispersion 6.

Example 1

Aqueous dispersion 1 (16 parts) obtained in Preparation Example 2, aqueous dispersion 2 (26 parts) obtained in Preparation Example 3, aqueous dispersion 3 (7 parts) obtained in Preparation Example 4, and aqueous dispersion 4 (17 parts) obtained in Preparation Example 5 were mixed. To the mixture obtained, a mixed liquid of glycerin, Proxel GXL (manufactured by Lonza KK), UCOAT UX-320 (manufactured by Sanyo Chemical Co., Ltd.), Surfynol 465 (manufactured by Nissin Chemical Industry Co., Ltd.), TEA-80 (manufactured by Junsei Chemical Industries, Ltd.), and ion-exchanged water was added and stirred so that the composition obtained has the composition of Table 1, followed by filtration through a filter having a pore diameter of 5 μm to obtain an aqueous black ink of Example 1.

Examples 2 to 3

Aqueous black inks of Examples 2 to 3 were obtained in the same manner as in Example 1, except that the amount of aqueous dispersion liquid 3 in Example 1 was changed as in Table 1.

Comparative Example 1

Aqueous dispersion 1 (3 parts) obtained in Preparation Example 2, aqueous dispersion 4 (14 parts) obtained in Preparation Example 5, and aqueous dispersion 5 (20 parts) obtained in Preparation Example 6 were mixed. To the mixture obtained, a mixed liquid of glycerin, Proxel GXL (manufactured by Zeneca Co., Ltd.), UCOAT UX-320 (manufactured by Sanyo Chemical Industry Co., Ltd.), Surfynol 465 (manufactured by Nissin Chemical Industry Co., Ltd.), and ion-exchanged water was added and stirred so that the composition obtained has the composition described in Table 1, followed by filtration through a filter having a pore diameter of 5 μm to obtain an aqueous black ink of Comparative Example 1.

Comparative Examples 2 to 3

Aqueous black inks of Comparative Examples 2 to 3 were obtained in the same manner as in Comparative Example 1, except that, in Comparative Example 1, aqueous dispersion 6 obtained in Preparation Example 7 or aqueous dispersion 2 obtained in Preparation Example 3 was added as in Table 1, instead of aqueous dispersion 5.

Comparative Example 4

An aqueous black ink of Comparative Example 4 was obtained in the same manner as in Example 1, except that, in Example 1, UCOAT UX-320 was not used and the amount of aqueous dispersion 3 was changed as in Table 1.

under the conditions of a D65 light source, a viewing angle of 2° and status I. The results are indicated in Table 2 below.
(Uniformity Evaluation of Sublimation Transfer)

Dyed products dyed by the sublimation transfer dyeing method were obtained by superimposing the ink attaching surface of each of the intermediate recording media on polyester fabric (Teijin Tropical), and subjecting the resulting fabric to heat treatment using a desktop automatic flat pressing machine (AF-65TEN manufactured by Asahi Garment Machinery Co., Ltd.) under a condition of 200° C. for 20 seconds. The difference in black color hue between the dyed products described above and the dyed products obtained under the condition of 200° C. for 60 seconds was visually observed and evaluated on the basis of the following evaluation criteria. The evaluation results are indicated in Table 2 below.

—Evaluation Criteria—
A: There is almost no variation in black hue between the transfer time of 60 seconds and 20 seconds, and sufficient dyeing concentration is achieved even at the transfer time of 20 seconds.

TABLE 1

| Aqueous black ink composition | | Example | | | Comparative Example | | | |
|---|---|---|---|---|---|---|---|---|
| | | 1 | 2 | 3 | 1 | 2 | 3 | 4 |
| Preparation Example 2 | Aqueous dispersion 1 | 16 | 16 | 16 | 3 | 3 | 16 | 16 |
| Preparation Example 3 | Aqueous dispersion 2 | 26 | 26 | 26 | | | 26 | 26 |
| Preparation Example 4 | Aqueous dispersion 3 | 7 | 5 | 3 | | | | 9 |
| Preparation Example 5 | Aqueous dispersion 4 | 17 | 17 | 17 | 14 | 17 | 17 | 17 |
| Preparation Example 6 | Aqueous dispersion 5 | | | | 20 | | | |
| Preparation Example 7 | Aqueous dispersion 6 | | | | | 17 | | |
| Other Components | Glycerin | 15 | 15 | 15 | 15 | 15 | 15 | 15 |
| | Proxel GXL | 0.1 | 0.1 | 0.1 | 0.1 | 0.1 | 0.1 | 0.1 |
| | UCOAT UX-320 | 7.5 | 7.5 | 7.5 | 7.5 | 7.5 | 7.5 | |
| | Surfynol 465 | 0.2 | 0.2 | 0.2 | 0.2 | 0.2 | 0.2 | 0.2 |
| | TEA-80 | 0.1 | 0.1 | 0.1 | 0.1 | 0.1 | 0.1 | 0.1 |
| | Ion-exchanged water | | | | Balance | | | |
| Total | | 100 | 100 | 100 | 100 | 100 | 100 | 100 |

[Evaluation]

The respective inks prepared were filled into an inkjet printer (PX-504A, trade name of a product manufactured by EPSON Co., Ltd.), and respective intermediate recording media in each of which a single color solid image of 100% duty was printed were obtained using a low-coated paper having a basis weight of 45 g as an intermediate recording medium. Dyed products dyed by the sublimation transfer method were obtained by superimposing the ink attaching surface of each of the intermediate recording media obtained on polyester fabric (Teijin Tropical), and subjecting the resulting fabric to heat treatment using a desktop automatic flat pressing machine (AF-65TEN manufactured by Asahi Garment Machinery Co., Ltd.) under a condition of 200° C. for 60 seconds. The dyed products obtained were evaluated as follows.
(Evaluation of Dyeing Concentration)

Dyed parts of the respective dyed products obtained were subjected to colorimetry using a spectroscopic colorimeter "eXact (manufactured by X-Rite Inc.)", and the dyeing concentration was measured. Colorimetry was carried out B: There is variation in black color hue between the transfer time of 60 seconds and 20 seconds, and in the case of 20 seconds of transfer time, dyeing concentration is low and sufficient concentration is not achieved.
C: Variation in black hue is large between the transfer time of 60 seconds and 20 seconds, and in the case of 20 seconds of transfer time, black hue is not achieved and the dyeing concentration is also low.

(Color Rendering Evaluation 1: Color Difference Between D65 Light Source and F2 Light Source)

Hue L*a*b* of dyed products obtained under the condition of 200° C. for 60 seconds described above was measured using spectroscopic colorimeter "eXact (manufactured by X-Rite Inc.)". Colorimetry was performed using the conditions of a viewing angle of 2° and status I, and the respective values of L*a*b* at the D65 light source and F2 light source were obtained. From the values of L*a*b* obtained with respect to each light source, the color difference ΔE was obtained on the basis of the following equation (1). The results are indicated in Table 2 below.

$$\Delta E = [(L^*_{D65} - L^*_{F2})^2 + (a^*_{D65} - a^*_{F2})^2 + (b^*_{D65} - b^*_{F2})^2]^{1/2} \qquad (1)$$

Further, the difference in the black color hue of the dyed products obtained between D65 light source and F2 light source was visually observed, and the difference was evaluated on the basis of the following evaluation criteria. The evaluation results are indicated in Table 2 below.

—Evaluation Criteria—

A: The difference in the black color hue between D65 light source and F2 light source is small and the difference is almost not perceived.

B: A slight difference in the black color hue between D65 light source and F2 light source is observed.

C: The difference in the black color hue between D65 light source and F2 light source is great, and it appears bluish under F2 light source.

(Color Rendering Evaluation 2: Color Difference Between D65 Light Source and a Light Source)

Hue L*a*b* of dyed products obtained under the condition of 200° C. for 60 seconds described above was measured using spectroscopic colorimeter "eXact (manufactured X-Rite Inc.)". Colorimetry was performed using the conditions of a viewing angle of 2° and status I, and the respective values of L*a*b* at the D65 light source and A light source were obtained. From the values of L*a*b* obtained with respect to each light source, the color difference ΔE was obtained on the basis of the following equation (2). The results are indicated in Table 2 below.

$$\Delta E=[(L^*_{D65}-L^*_A)^2+(a^*_{D65}-a^*_A)^2+(b^*_{D65}-b^*_A)^2]^{1/2} \quad (2)$$

Further, the difference in the black color hue of the dyed products obtained between D65 light source and A light source was visually observed, and the difference was evaluated on the basis of the following evaluation criteria. The evaluation results are indicated in Table 2 below.

—Evaluation Criteria—

A: The difference in the black color hue between D65 light source and A light source is small and the difference is almost not perceived.

B: A slight difference in the black color hue between D65 light source and A light source is observed.

C: The difference in the black color hue between D65 light source and A light source is great, and it appears reddish under A light source.

(Light Resistance Test)

The respective dyed products obtained under the condition of 200° C. for 60 seconds described above were left for 24 hours under the conditions of 100,000 Lux illuminance, humidity 60% RH, and temperature 24° C., using Low-temperature Xenon Weather Meter XL75, which is a trade name of a weather meter manufactured by Suga Test Instruments Co., Ltd. With regard to the respective dyed products after the test, a degree of change in color of an area irradiated by the xenon lamp was judged on the basis of JIS blue scale for change in color. The greater the judgement grade, the lower the degree of change in color, which means an excellent result. The test results are indicated in Table 2 below.

TABLE 2

|  |  | Example | | | Comparative Example | | | |
|---|---|---|---|---|---|---|---|---|
|  |  | 1 | 2 | 3 | 1 | 2 | 3 | 4 |
| Evaluation of dyeing concentration | Density BK | 1.52 | 1.51 | 1.51 | 1.47 | 1.48 | 1.50 | 1.44 |
| Uniformity evaluation of sublimation transfer | Judgement by visual observation | A | A | A | A | C | B | A |
| Color rendering evaluation 1 | Color difference ΔE | 1.22 | 1.38 | 1.76 | 3.41 | 2.87 | 4.08 | 1.25 |
|  | Judgement by visual observation | A | A | A | C | C | C | A |
| Color rendering evaluation 2 | Color difference ΔE | 1.22 | 1.51 | 2.07 | 3.42 | 2.44 | 3.81 | 1.28 |
|  | Judgement by visual observation | A | A | B | C | B | C | A |
| Light resistance evaluation | Judgement grade | Grades 4 to 5 | Grades 4 to 5 | Grades 4 to 5 | Grades 3 to 4 | Grades 3 to 4 | Grades 4 to 5 | Grades 4 to 5 |

As is clear from the results of Table 2, the aqueous black inks of Examples 1 to 3 had almost no influence on the color rendering property, had a high dyeing concentration, had black color of high quality, and were excellent in light resistance, compared to the aqueous black inks of Comparative Examples 1 to 4. From this result, it can be seen that the aqueous black inks of Examples 1 to 3 are extremely useful as an ink for various recording purposes, particularly as an ink for inkjet textile printing.

The invention claimed is:

1. A black ink composition for inkjet textile printing, comprising a water-soluble organic solvent, a urethane resin emulsion, a dispersant, and at least four sublimable dyes, wherein at least three types of the sublimable dyes are selected from the group consisting of C.I. Disperse Yellow, C.I. Disperse Red, and C.I. Disperse Blue, and include C.I. Disperse Yellow 54, C.I. Disperse Red 60, and C.I. Disperse Blue 360, and at least one of the sublimable dyes has a maximum absorption wavelength in a wavelength range of 640 nm or more and less than 680 nm in a visible spectroscopic absorption of a solution dissolved in acetone, wherein the sublimable dye having a maximum absorption wavelength in a wavelength range of 640 nm or more and less than 680 nm is a sublimable dye is selected from the group consisting of C. I. Disperse Blue 359, C. I. Disperse Blue 60, and C. I. Disperse Blue 334.

2. The black ink composition for inkjet textile printing according to claim 1, wherein the dispersant is a styrene-(meth)acrylic copolymer or a formalin condensate of an aromatic sulfonic acid or a salt thereof.

3. The black ink composition for inkjet textile printing according to claim 1, wherein the resin emulsion is a polycarbonate-based urethane resin emulsion.

4. The black ink composition for inkjet textile printing according to claim 1, wherein the dispersant is a styrene-(meth)acrylic copolymer and the copolymer has a mass average molecular weight of 5,000 to 17,000 and an acid value of 100 to 250 mg KOH/g.

5. The black ink composition for inkjet textile printing according to claim 1, wherein the dispersant is selected from the group consisting of a formalin condensate of creosote oil sulfonic acid or a salt thereof and a formalin condensate of methylnaphthalene sulfonic acid or a salt thereof.

6. The black ink composition for inkjet textile printing according to claim 1, wherein the water-soluble organic solvent includes at least one selected from glycerin and diglycerin.

7. An ink set for inkjet textile printing, comprising the black ink composition for inkjet textile printing according to any one of claim 1, a yellow ink composition for inkjet textile printing, a magenta ink composition for inkjet textile printing, and a cyan ink composition for inkjet textile printing.

8. A method for textile printing of a hydrophobic fiber, comprising:
using, as an ink, the black ink composition for inkjet textile printing according to any one of claim 1 and attaching a droplet of the ink to an intermediate recording medium using an inkjet printer to obtain a recorded image; and
transferring the recorded image to the hydrophobic fiber by contacting the hydrophobic fiber with a surface to which the ink is attached in the intermediate recording medium, followed by heat treatment.

9. A dyed hydrophobic fiber obtained by the method for textile printing of a hydrophobic fiber according to claim 8.

10. A method for textile printing of a hydrophobic fiber, comprising:
using, as an ink, each ink composition included in the ink set for inkjet textile printing according to claim 7 and attaching a droplet of the ink to an intermediate recording medium using an inkjet printer to obtain a recorded image; and
transferring the recorded image to the hydrophobic fiber by contacting the hydrophobic fiber with a surface to which the ink is attached in the intermediate recording medium, followed by heat treatment.

11. A dyed hydrophobic fiber obtained by the method for textile printing of a hydrophobic fiber according to claim 10.

* * * * *